UNITED STATES PATENT OFFICE.

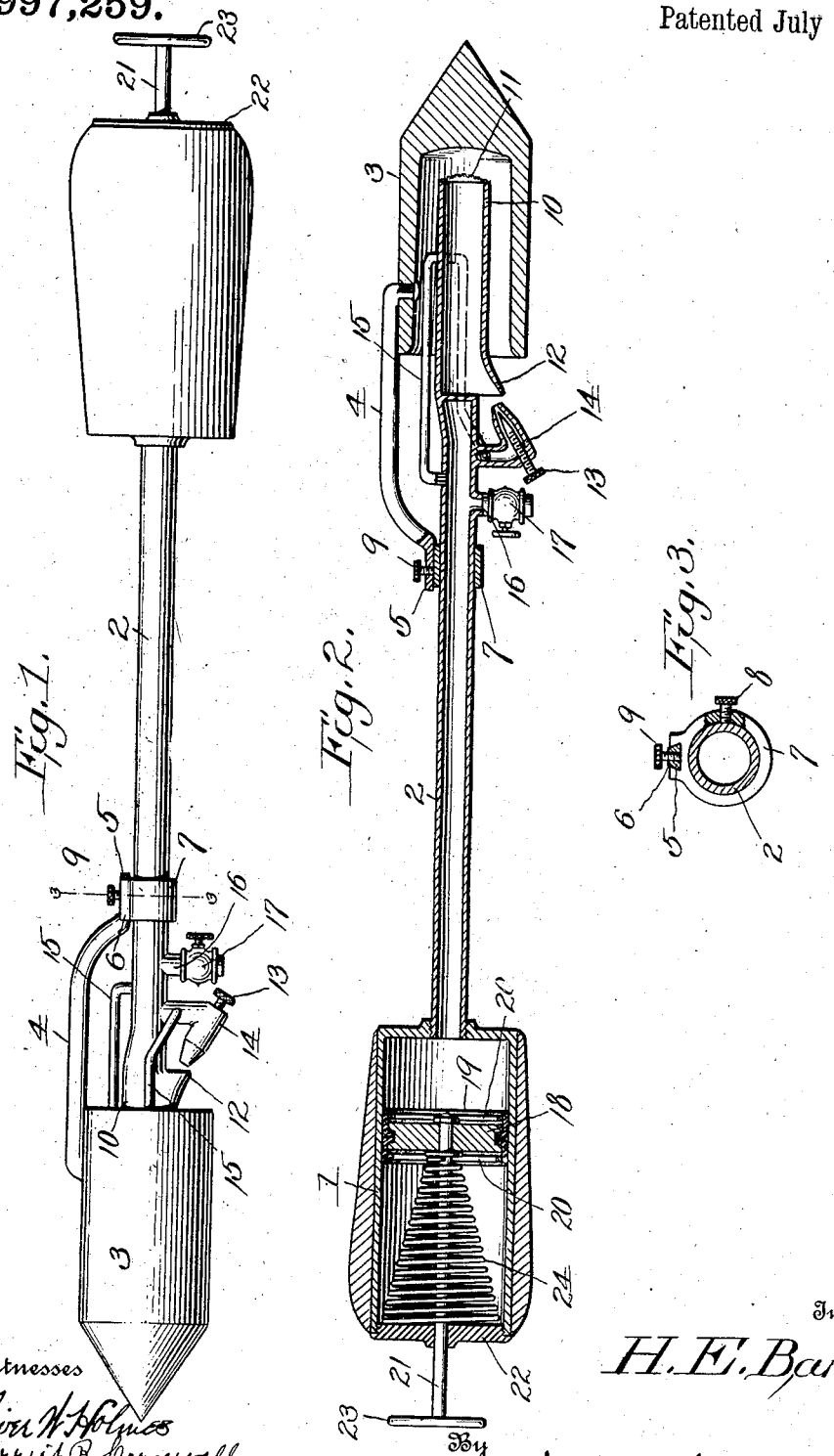

HIRAM E. BARBER, OF STAMFORD, NEBRASKA.

SELF-HEATING SOLDERING IMPLEMENT.

997,259.  Specification of Letters Patent.  Patented July 11, 1911.

Application filed November 17, 1910. Serial No. 592,766.

*To all whom it may concern:*

Be it known that I, HIRAM E. BARBER, citizen of the United States, residing at Stamford, in the county of Harlan and State of Nebraska, have invented certain new and useful Improvements in Self-Heating Soldering Implements, of which the following is a specification.

The present invention relates in general to soldering devices, and more particularly to that type of soldering implements which are self heating and are constructed so as to be used continuously without the necessity of intermittently placing the same in a fire or submitting them to the action of a blow torch.

The object of the invention is the provision of a soldering implement of this character which is comparatively simple and inexpensive in its construction, which is positive and reliable in its operation, and which will operate effectively either in an upright, an inverted, or an inclined position.

The invention further contemplates the provision of a soldering implement which need not be connected to a gas or electric main, which can be easily and quickly prepared for use, and which will enable a workman to accomplish much more than with the ordinary soldering coppers in general use.

With these and other objects in view, the invention consists in certain combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of a self heating soldering implement constructed in accordance with the invention. Fig. 2 is a longitudinal sectional view through the same, and Fig. 3 is a transverse sectional view on the line 3—3 of Fig. 1.

Corresponding and like parts are referred to in the following description and indicated in all the views of the drawing by the same reference characters.

Specifically describing the present embodiment of the invention, the numeral 1 designates the fuel reservoir which is cylindrical in shape, and 2 a tubular stem which projects axially from one end of the reservoir. A soldering copper 3 is detachably mounted upon this tubular stem and has a hollow formation so as to receive a burner within the same. The said soldering copper 3 is provided upon one side thereof with a rearwardly extending arm 4 the end of which is curved inwardly and provided with a dovetail finger 5. This finger is received within a dovetail slot formed in an enlargement 6 upon one side of a collar 7. A set screw 8 is employed for locking the collar rigidly in position upon the stem 2, while a set screw 9 is provided for locking the dovetail finger 5 within the dovetail slot. By loosening the set screw 8, the collar 7 can be adjusted upon the tubular stem 2 for the purpose of moving the soldering copper 3 in and out with respect to the burner, while by loosening the set screw 9, the finger 5 can be withdrawn from the dovetail slot for the purpose of detaching the soldering copper from the device.

Rigid with the end of the tubular stem 2 and projecting axially therefrom is an air mixing tube 10 which projects within the hollow portion of the soldering copper and has a piece of gauze 11 applied to the forward end thereof. The rear end of this air mixing tube 10 is flared laterally at 12 and formed with a rearwardly facing opening designed to receive a jet of fuel from the needle valve 13. This needle valve 13 is arranged in the inwardly opening end of a lateral arm 14 projecting from the tubular stem 2, the said lateral arm communicating with one end of a fuel supply tube 15 which extends between the mixing tube 10 and the soldering copper so as to be heated by the flame of the burner when the device is in operation, the opposite end of the fuel supply tube communicating with the stem 2. With this construction, it will be obvious that fuel will be highly heated and vaporized as it passes through the tube 15 and will be discharged from the needle valve 13 in the form of a jet which will enter the flared portion at the rear end of the mixing tube 10 and at the same time draw air into the said mixing tube. The air and vapor will be thoroughly mixed within this tube so that a perfect combustion will take place when the mixture passes through the gauze 11, the flame being caused to pass rearwardly between the soldering copper and the mixing tube so as to maintain the soldering copper at a uniform temperature and also heat the fuel supply tube 15.

The tubular stem 2 is also provided at a point toward the burner end thereof with an inlet opening communicating with a short lateral pipe 16 provided with a valve 17. A piston 18 is mounted within the cylindrical reservoir 1 and is provided with the oppositely facing washer members 19, the edges of which are held closely against the interior walls of the reservoir by the rings 20. A piston rod 21 is connected to the piston 18 and passes rearwardly through the head 22 of the reservoir where it terminates in a handle 23, a spring 24 being interposed between the said head of the reservoir and the piston. This spring normally tends to force the piston inwardly so as to produce a constant pressure upon the fuel, and preferably has a substantially conical formation as shown, so as to occupy a very small amount of space when compressed.

When it is desired to use the implement, the soldering copper is detached and the burner end of the device inserted into the liquid fuel, which may be either gasolene or alcohol, until the end of the lateral pipe 16 of the inlet opening is immersed therein. The piston 18 is then drawn upwardly against the action of the spring 44 so as to produce a partial vacuum within the reservoir and suck the liquid fuel into the same. The valve 17 of the inlet opening is then closed and the burner end of the device placed in a flame until it becomes sufficiently hot to vaporize the liquid fuel as it passes through the tube 15 and operate as previously described. The needle valve 13 is then opened to permit the fuel being supplied to the burner, and the soldering copper is again applied to the device after the burner is working properly. This soldering copper will be maintained at a uniform temperature as long as the burner is in operation and the implement can be used continuously instead of intermittently as is the case with the ordinary soldering coppers. The spring 24 will cause the piston 18 to bear against the fuel with a uniform pressure, and a uniform supply of fuel to the burner is thus assured regardless of whether the implement be in an upright, inverted, or an inclined position.

By the term "soldering copper" as used in this specification, I do not wish to be understood as meaning a member which must necessarily be constructed of copper, the said term being merely employed to designate the metallic member which is applied to the solder for melting the same.

Having thus described the invention, what I claim as new and desire to secure by Letters Patent, is:—

1. In a self heating soldering implement, the combination of a fuel tank, a tubular stem projecting from the fuel tank, an air mixing tube projecting axially from the end of the tubular stem, the rear end of the air mixing tube being flared laterally so as to open rearwardly, a lateral arm projecting from the stem and having the end thereof extended inwardly, said end having a jet opening adapted to discharge into the air mixing tube, a hollow soldering copper receiving the air mixing tube, and a fuel supply pipe leading from the tubular stem to the lateral arm and passing between the air mixing tube and the soldering copper.

2. In a self heating soldering implement, the combination of a fuel tank, a tubular stem leading therefrom and provided with a valved inlet opening, a burner carried by the tubular stem, a soldering copper mounted in coöperative relation to the burner so as to be heated by the same, a piston slidably mounted within the fuel tank, a spring normally tending to force the piston inwardly, and a piston rod connected to the piston for withdrawing it against the action of the spring, liquid fuel being sucked into the fuel tank through the inlet opening of the stem when the valve is open and the piston is drawn outwardly against the action of the spring, and a constant supply of fuel to the burner being caused by the action of the spring when the piston is released, substantially as described.

In testimony whereof I affix my signature in presence of two witnesses.

HIRAM E. BARBER.

Witnesses:
 Thos. A. Carraher,
 L. B. Carraher.

---

Copies of this patent may be obtained for five cents each, by addressing the "Commissioner of Patents, Washington, D. C."